Figure 1:
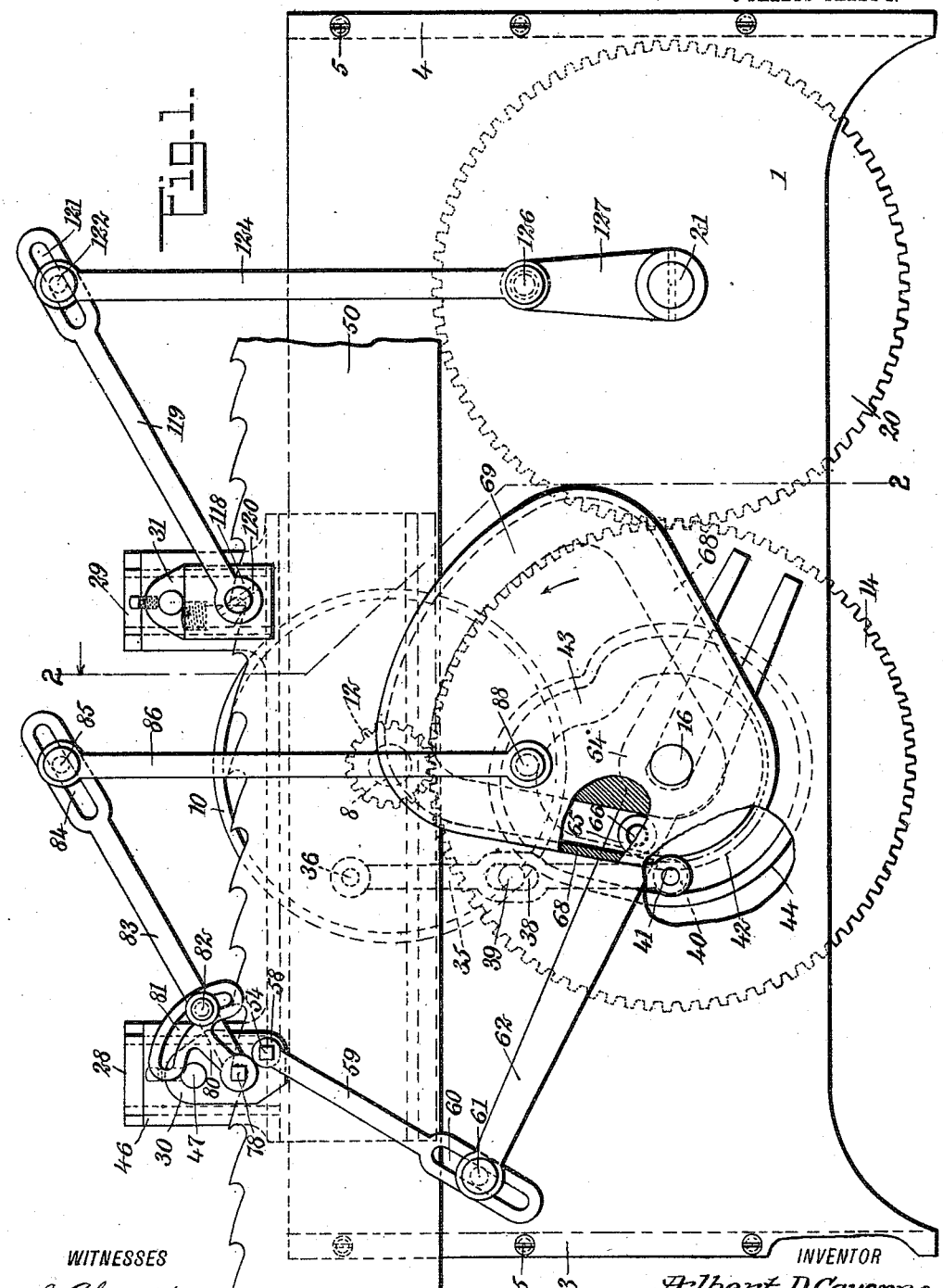

A. D. CAVERNO.
AUTOMATIC SWAGING AND SIZING MACHINE.
APPLICATION FILED JAN. 6, 1909.

972,599.

Patented Oct. 11, 1910.
3 SHEETS—SHEET 1.

WITNESSES
L. Almquist
Wm. J. Sperl

INVENTOR
Albert D. Caverno
BY
Munn & Co.
ATTORNEYS

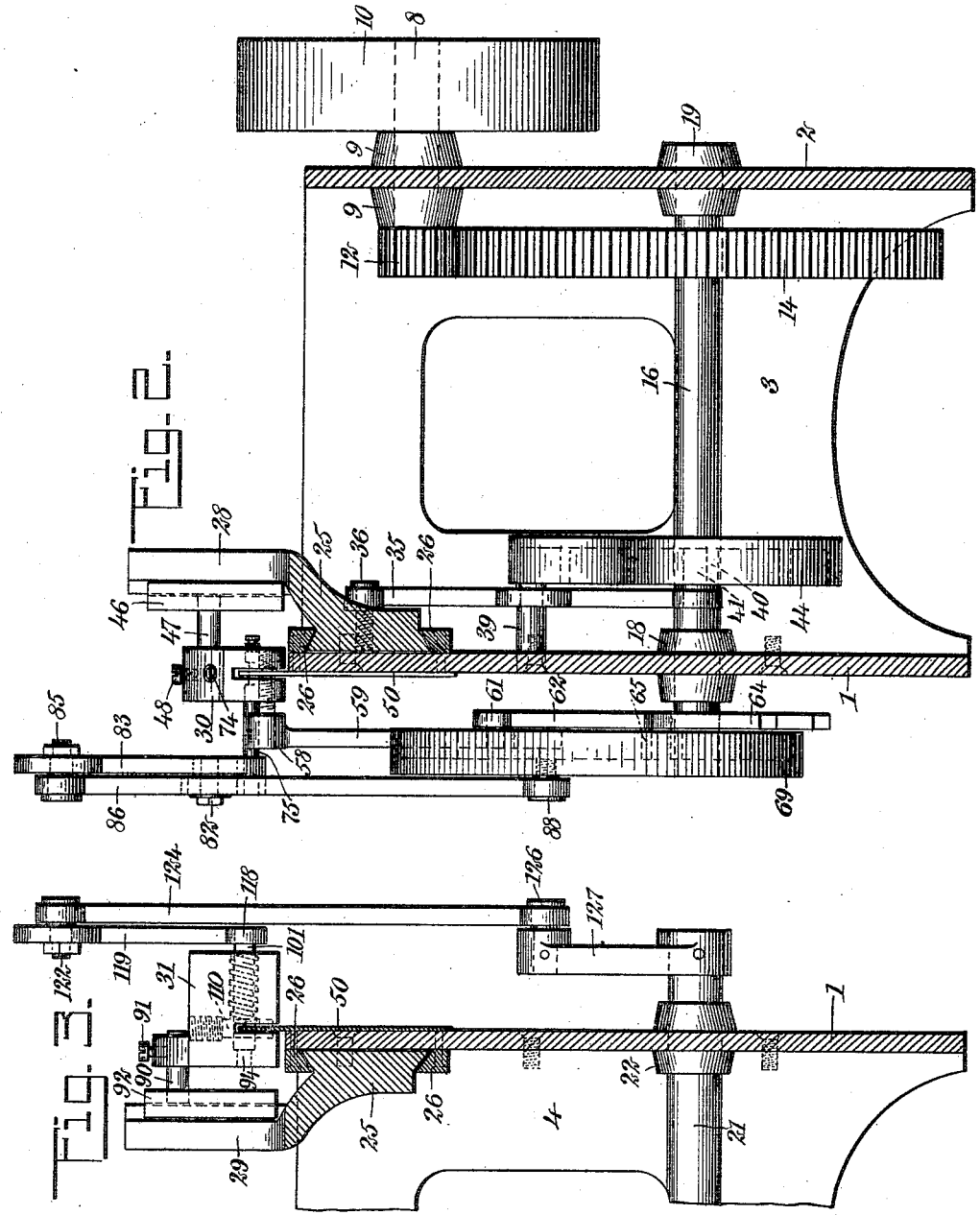

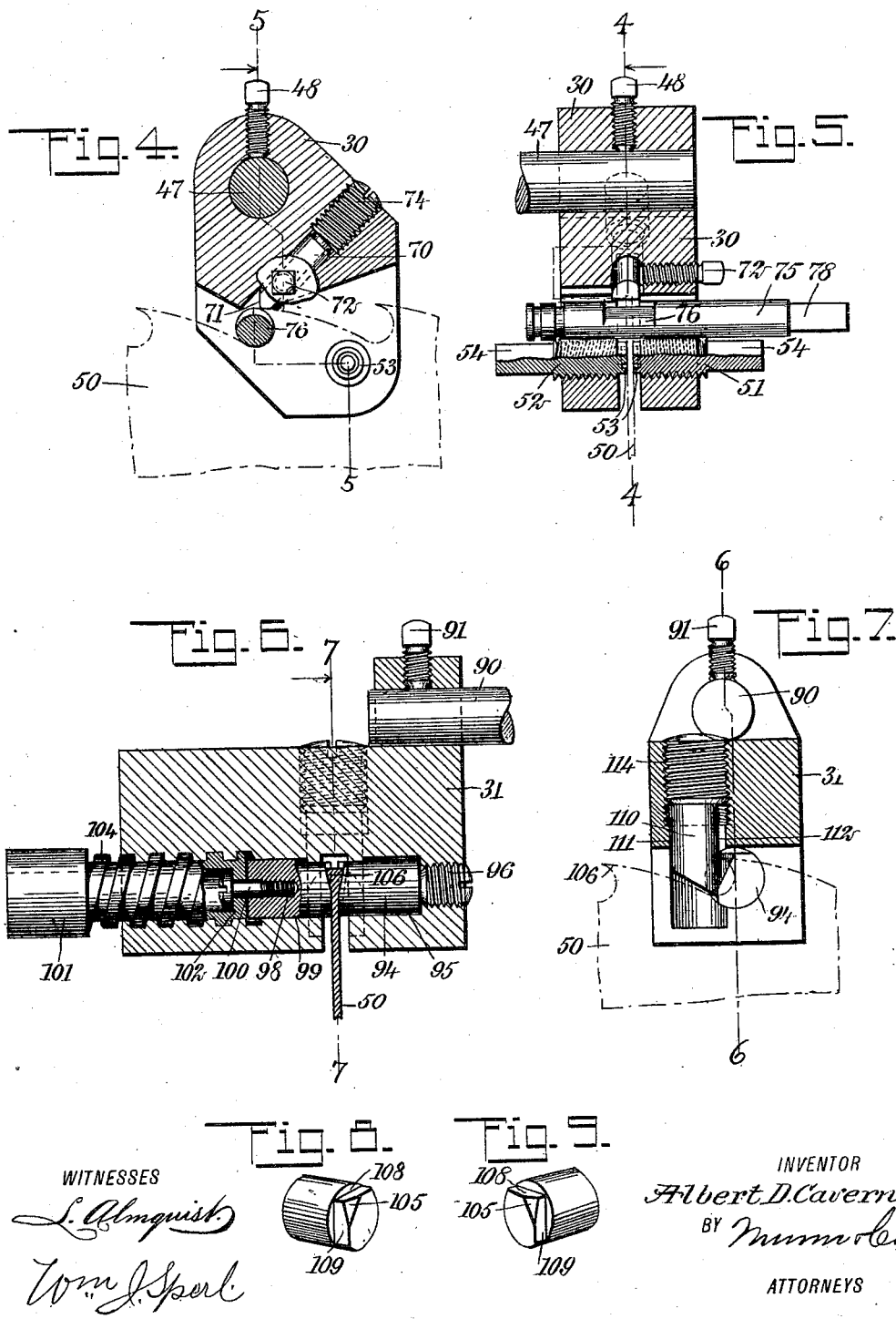

UNITED STATES PATENT OFFICE.

ALBERT D. CAVERNO, OF WINDSOR LOCKS, CONNECTICUT.

AUTOMATIC SWAGING AND SIZING MACHINE.

972,599. Specification of Letters Patent. Patented Oct. 11, 1910.

Application filed January 6, 1909. Serial No. 470,953.

*To all whom it may concern:*

Be it known that I, ALBERT D. CAVERNO, a citizen of the United States, and a resident of Windsor Locks, in the county of Hartford and State of Connecticut, have invented a new and Improved Automatic Swaging and Sizing Machine, of which the following is a full, clear, and exact description.

This invention relates to a machine for swaging and sizing the teeth of saws.

An object of the invention is to provide a machine which will automatically size and swage the teeth of a saw, and one in which the pressure exerted to size the teeth will be uniform, and the machine will operate continuously after once having been set in operation.

The invention consists in the construction and combination of parts, to be more fully described hereinafter, and particularly set forth in the claims.

Reference is to be had to the accompanying drawings, forming a part of this specification, in which similar characters of reference indicate corresponding parts in all the views, and in which—

Figure 1 is a side elevation with parts broken away, and showing a band saw secured in the machine; Fig. 2 is a sectional view taken on the line 2—2 in Fig. 1, looking in the direction of the arrow; Fig. 3 is a section taken on the same line, but looking in the opposite direction; Fig. 4 is a vertical section taken on the line 4—4 in Fig. 5, showing the details of the swage-head; Fig. 5 is a section taken on the line 5—5 in Fig. 4; Fig. 6 is a section taken on the line 6—6 in Fig. 7, showing the interior construction of the sizing-head; Fig. 7 is a section taken on the line 7—7 in Fig. 6; and Figs. 8 and 9 are detail views of the sizing dies.

The bed of the machine comprises side frames 1 and 2 and end frames 3 and 4. Said frames may be fastened together by means of screws 5 or be cast integrally, as desired.

The driving shaft 8 is journaled in bearings 9, formed on the side frame 2, and said shaft may be provided on one end with a driving pulley 10, and on the other end with a pinion 12. The pinion 12 is adapted to mesh with a gear-wheel 14 secured to a cam shaft 16 journaled in bearings 18 and 19 on the side frames 1 and 2. The gear-wheel 14 meshes with a gear-wheel 20 secured to the crank shaft 21, which is journaled in bearings 22, also mounted on the side frames 1 and 2.

A carriage 25 is mounted to slide in ways 26 secured to the side frame 1. Said carriage 25 may be provided with upwardly-projecting arms 28 and 29, which are adapted to receive the swage-head 30 and the sizer-head 31 respectively. Said heads are slidably mounted upon the arms 28 and 29, and may be held in adjusted position by any suitable means. Said arms may also be secured to the carriage 25 in such a manner that they may be adjusted longitudinally of said carriage, in order to adapt the machine for saws having teeth of various sizes and spacing.

A lever 35 is pivoted to the carriage 25 by means of a bolt 36 passing through the upper end of said lever. Intermediate the length of said lever is an elongated slot 38, which receives a pin 39 secured to the side frame 1. A roller 40 is mounted to rotate about a pin 41 secured in the lower end of the lever 35, and is adapted to move within the groove or channel 42 formed in one side of a cam 44 mounted to rotate with the shaft 16, said groove or channel having a depression 43. The rotation of the shaft 16 and the cam 44 causes the carriage 25 to be reciprocated at proper intervals, in order to bring the swage and sizer heads over the teeth of the saw, and also to feed said saw along the machine.

The swage head 30 is connected to a slide 46 by means of a bar 47, which may be secured in said head 30 by means of a set screw 48, said bar projecting laterally from the slide 46. In order to clamp the saw 50 in position on the machine, I provide left-hand and right-hand screws 51 and 52 respectively. These screws are provided on their inner ends with circular channels 53, and may be formed on their outer ends with square shanks 54. The screw 52 is adjusted for the particular width of the saw about to be operated on, and the screw 51 is intended to be moved periodically in order to clamp and release the saw. Said screws are mounted in the lower end of the swage-head 30.

The shank 54 of the screw 51 is held in the upper end 58 of a lever 59. Said lever 59 is provided at its lower end with an elongated slot 60, which receives a bolt 61 mounted in the left-hand end of a lever 62. The other end 64 of the lever 62 is forked and rests upon the cam-shaft 16. A roller 65 is mounted to rotate about a pin 66, which is secured in the lever 62, said roller being adapted to travel along a channel 68 formed in a triangular cam 69 which is mounted to rotate with the cam-shaft 16. The rotation of the cam 69 causes the lever 62 to be moved back and forth on the shaft 16, and thus tightens and loosens the screw 51, in order to clamp or free the saw 50.

An anvil 70 is mounted in an inclined passage 71 in the swage-head 30, and may be held in adjusted position by means of a set-screw 72, passing through the swage-head and engaging the side of the anvil. In order to determine the height at which the anvil shall be supported, a screw 74 is mounted in the swage-head 30 and adapted to bear against the rear end of the anvil 70. This screw also takes up the pressure exerted by the swaging tool in its operation upon a saw tooth. The swage consists of a shaft 75 having an eccentric portion 76, which is adapted to come in contact with the under side of a tooth of the saw 50. One end of the shaft 75 is provided with a square shank 78, which is adapted to fit within one end of an adjusting segment 80. Said segment is formed with a circular slot 81, through which a bolt 82 is passed, said bolt being fastened in a lever 83. The lower end of the lever 83 is mounted to rotate about the shaft 75. By adjusting the relative positions of the segment 80 and the lever 83, the amount of throw of the swage 76 may be regulated. The upper end of the lever 83 is provided with an elongated slot 84, which receives a pin 85 mounted in the upper end of a link 86. The lower end of the link 86 is journaled about a pin 88 mounted in the outer face of the cam 69.

The upper end of the sizer-head 31 receives one end of a post 90, which is secured within said head by means of a set-screw 91, said post projecting laterally from a slide 92 mounted upon the arm 29. It will be understood that the slides 46 and 92 may be provided with feed-screws, in order that the position of said slides may be varied, such construction being well known.

A stationary die 94 is mounted in a bearing 95 formed in the lower end of the sizer-head 31. The position of said die may be varied by means of an adjusting screw 96 which is adapted to bear against the inner end of the die 94. A movable die 98 is slidably mounted in a bearing 99 in alinement with the stationary die 94. Said movable die 98 is connected by means of a screw 100 to a left-hand feed-screw 101. Said feed-screw 101 is hollow and provided with a shoulder 102 at its inner end, against which the head of the screw 100 is adapted to bear. The feed-screw 101 is provided with square threads 104 adapted to co-act with similar threads formed in the interior of the sizer-head 31. The connection between the feed screw 101 and the die 98 is such that the screw may be rotated and draw the die longitudinally therewith. The inner faces of the stationary and movable dies are at right-angles to the axes of said dies, and are backed off at 105, in order that the upper end of the saw teeth 106 may be formed so as to extend equally over both faces of the saw. The ends of the stationary and movable dies may be cut away at 108 and 109. A seating plug 110 is mounted to slide within a passage 111 formed in the sizer-head 31. Said plug is flattened on one face 112, which is adapted to bear against the cut-away portions 109 of the dies 94 and 99. The position of the said plug 110 may be varied by means of a screw 114 adapted to bear against the upper end of said plug and held within the sizer-head. The said plug 110 is adapted to rest upon the upper side of a tooth of the saw and bear against the point of the next tooth. The movable die, being forced against the stationary die, presses the metal of the tooth, so that all teeth shall be of the same thickness. As the machine rotates continuously, the pressure exerted on each tooth is the same, and the product is therefore uniform.

The outer end of the feed-screw 101 is secured to the lower end 118 of a lever 119 by means of a pin 120. The upper end of the lever 119 is provided with an elongated slot 121, which receives a pin or bolt 122, held in the upper end of a link 124. The lower end of the link 124 is pivoted about a stud 126, fastened in the upper end of a crank arm 127. Said crank arm is secured to the crank-shaft 21 in order to rotate therewith.

The operation of the machine is as follows: As shown in the drawings, the machine has just completed one cycle and is about to start on another. The cam 69, in moving in the direction of the arrow, causes the lever 62 to be moved outwardly and, through the lever 59, causes the screw 51 to be turned so as to release the saw. Simultaneously therewith, the link 86 and lever 83 are operated to rotate the eccentric swage 76 to free it from the anvil 70, and the link 124 and lever 119 are operated to withdraw the die 98 from contact with the saw. The cam 44 now oscillates the lever 35 so as to force the carriage 25 to the right, and as the swage shaft 75, and the seating plug 110 of the sizer-head are each in engagement with a tooth of the saw, the saw will be moved along with the carriage. When the roller 65 is moved in the cam 69 from the upper left-hand corner, the lever 62 is not moved, but the cam 44 causes the lever 35 to oscillate in the opposite direction and move the carriage 25 toward the left, taking with it the swaging and sizer-heads, which pass over the saw and are positioned against the teeth following those which have just been acted upon by the swage and sizer-heads. The depression 43 in the cam 44 allows the carriage 25 to remain stationary at this point. In the further operation of the machine, the roller 65 travels along the straight side of the cam 69 thereby drawing the lever 62 inwardly and tightening the screw 51 against the saw. At this time, the roller 40 is in the depression 43, and the lever 35 is at rest. During the time that the roller 65 is traveling through the straight right-hand side of the cam 69, the swage eccentric 76 and the sizer die 98 are moved to swage and size the teeth which are at that time held within the respective heads of the machine.

From the construction and operation set forth, it will be seen that the saw teeth are swaged and sized uniformly, and that the operation is automatic after the machine has once been started and properly adjusted. The dies are operated by power, and the amount of travel of each die can be so regulated that a tooth of uniform size can always be produced.

Having thus described my invention, I claim as new and desire to secure by Letters Patent:—

1. In a swaging and sizing machine, the combination of a swage-head, a sizer-head, a carriage upon which the said heads are mounted a distance apart, saw clamping means carried by one of the said heads, and means for automatically moving the carriage and operating the clamping means and the swage and sizer heads.

2. In a swaging and sizing machine, the combination of a swage-head, a sizer-head, means for clamping a saw, and automatic means arranged to operate said swage and sizer-heads to swage and size the teeth of a saw and then release said clamping means and move said heads into position to act upon other teeth of the saw.

3. In a swaging and sizing machine, the combination of a carriage, a swage-head and a sizer-head mounted on said carriage, means carried by one of the heads for clamping a saw, means for operating said swage-head, means for operating said sizer-head, means for moving said carriage, and a power shaft from which the said heads and carriage are operated.

4. In a swaging and sizing machine, the combination of a carriage, a clamp carried by the carriage for holding a saw, means for automatically tightening and loosening the clamp, a sizer-head carried by the carriage and comprising a stationary and a movable die, means for automatically moving the carriage to bring the sizer-head into position to act upon the tooth of the saw adjacent to the one previously acted upon, and means for automatically operating the movable die.

5. In a swaging and sizing machine, the combination of a frame provided with ways on its side, a carriage mounted to slide in the said ways and provided with an upwardly projecting member, a swage head carried by and projecting laterally from said member, a swage mounted in the head, a clamp carried by the swage head for clamping a saw, and means for automatically operating the carriage, swage and clamp.

6. In a swaging and sizing machine, the combination of a carriage, a slide mounted on the carriage, a swage head adjustably mounted on the slide, a swage mounted in said head, means for clamping said swage-head upon a saw, and means for reciprocating said carriage.

7. In a swaging and sizing machine, a swage head, an anvil in the head, a shaft in said head and carrying a swage, a slotted segment on one end of the shaft, a lever mounted to turn on said shaft and provided with a pin working in the slot of the segment, the outer end of the lever being slotted, a cam, and a link having pins at its ends, one working in the cam and the other in the slot of the lever.

8. In a swaging and sizing machine, the combination of a sizer head, a stationary die, a movable die, said dies having cut-away portions, means for operating the movable die and an adjustable seating plug mounted in the sizer head at right angles to the said dies, said plug having one side flattened to bear against the cut away portions of the dies and its end beveled to rest upon the upper side of a saw tooth.

9. In a swaging and sizing machine, the combination of a carriage, a swage-head and a sizer-head mounted on said carriage, an oscillatory swage in said swage-head, clamping means for holding a saw, sizing dies in said sizer-head, and means arranged to automatically clamp said saw and operate said swage and sizing dies and then release said clamp and move said carriage to bring said heads into coöperative relation with a new series of teeth.

10. In a swaging and sizing machine, the combination of a carriage, a swage-head mounted on said carriage, an anvil in said head, an eccentric swage, means connected to oscillate said swage and having means for varying the extent of oscillation, a clamp, means for tightening said clamp to hold a saw during the swaging operation and automatically release the same after said operation is completed, and means for thereafter moving said carriage to bring said swage head into coöperative relation with another saw tooth.

11. In a swaging and sizing machine, the combination of a carriage, means for clamping a saw, means carried by the carriage for swaging a saw tooth, and means for moving the carriage and thereby the swaging means, whereby the saw will be fed forward, said clamping means being automatically released when said tooth is swaged and said carriage and swaging means automatically returned to their initial position.

12. In a swaging and sizing machine, the combination of a carriage, means carried by the carriage for clamping the saw, means carried by the carriage for swaging a saw tooth, means carried by the carriage for sizing a saw tooth, and means for moving the carriage, whereby the saw will be fed forward by the swaging and sizing means, said mechanism being so timed that after the saw has been swaged and sized, the swaging and sizing means will be rendered inoperative and the carriage returned to its initial position.

13. In a sizing and swaging machine, a swage head, a clamping screw in the swage head for clamping a saw, a lever on one end of the screw, a driven shaft, means for operating the swage head from said shaft, a grooved cam on the shaft, and a lever having one end loosely connected with the first named lever and its other end forked to receive the said shaft, said lever being provided with a member working in the groove of said cam.

14. In a sizing and swaging machine, a frame, a carriage, a swage head on the carriage, a sizer head also on the carriage, a driven shaft, means for operating the swage head from said shaft, means for operating the sizer head from the shaft, a cam on the shaft and provided with a groove having a depression therein, and a lever fulcrumed on the frame and having one end pivoted to the carriage and having at the other end a pin working in the groove of the cam.

In testimony whereof I have signed my name to this specification in the presence of two subscribing witnesses.

ALBERT D. CAVERNO.

Witnesses:
GEORGE H. DOUNTON,
FRANK G. BURT.